United States Patent [19]
Yu

[11] Patent Number: 5,188,772
[45] Date of Patent: Feb. 23, 1993

[54] VAPOR-LIQUID CONTACTOR

[76] Inventor: Kaung M. Yu, 4211 Green Hills Cir., Sugarland, Tex. 77479

[21] Appl. No.: 813,769

[22] Filed: Dec. 27, 1991

[51] Int. Cl.⁵ .............................. B01F 3/04; B01F 5/24
[52] U.S. Cl. ................................. 261/94; 261/DIG. 72
[58] Field of Search .......................... 261/94, DIG. 72

[56] References Cited

U.S. PATENT DOCUMENTS

| | | | |
|---|---|---|---|
| 3,823,924 | 7/1974 | Hoon, Jr. ........................... | 261/94 |
| 3,924,807 | 12/1975 | Morgan ........................ | 261/DIG. 72 |
| 4,159,817 | 7/1979 | Ikawa ........................ | 261/DIG. 72 |
| 4,481,155 | 11/1984 | Frohwerk ................... | 261/DIG. 72 |
| 4,668,442 | 5/1987 | Lang ..................................... | 261/94 |
| 4,842,920 | 6/1989 | Banai et al. .................. | 261/DIG. 72 |

Primary Examiner—Tim Miles

[57] ABSTRACT

A vapor-liquid contacting device comprises: a spherical cage having a movable disk located inside. A weight piece is attached to the disk. The center of gravity of the weight piece is located on the axis of the disk. During the operation of a packed tower, the upward force of the vapor flow will cause the weight piece to seek the lowest position inside the cage, and the disk will end up in the horizontal position. As the liquid falls on the top of the disk, it would be spread and fall around the edge of the disk to form a liquid curtain. As the liquid cascades down the tower, it would be spread laterally and achieve a good liquid distribution and a good vapor-liquid contact.

9 Claims, 1 Drawing Sheet

VAPOR-LIQUID CONTACTOR

BACKGROUND OF THE INVENTION

This invention relates to a vapor-liquid contacting system. Distillation, absorption, and stripping are vapor-liquid contacting operations used in oil refinery, petrochemical, chemical and other related industries.

The vapor-liquid contact usually takes place in a tower. Inside the tower, the vapor-liquid contact can be accomplished through plates or packings. Plate-type towers utilize plates or trays, spaced apart by a predetermined distance, which service as the phase contacting area. Packings are designed to promote a large area of contact between phases with a minimum resistance to the flow of the two phases. Packings generally can be classified into two types: structured packings and random packings. Structured packings are the pre-assembled packing elements consisting of parallel corrugated strips of sheets or wire meshes. Random packings are dumped at random into a tower.

Random packings are in the form of divided solids, shaped so as to provide a good vapor-liquid contact. The liquid flows down over the surface of the solids, and is exposed to the vapor which flows upward through the open channels not filled by packings or the liquid. Liquid distribution and liquid channeling have a major effect on tower performance. A good liquid distributor to evenly distribute the liquid over the top of packings is a necessity for achieving a good vapor-liquid contact. Quite often vapor or liquid channeling inside a packed tower can occur at extreme high or low flow rates either in liquid or vapor phase.

I have now invented a novel random packing which provides lateral liquid distribution and an efficient vapor-liquid contact.

SUMMARY OF THE INVENTION

According to the present invention, a vapor-liquid contactor comprises a spherical cage and a movable packing assembly located inside the cage. The packing assembly comprises a disk and a weight piece. The weight piece is attached to the disk and its center of gravity is located on the axis of the disk. The upward force of the vapor flow will cause the center of gravity of the weight piece to move inside the cage and settle at the lowest position, and thus the disk will be in the horizontal position. As the liquid falls on top of the disk, it would be spread out across the disk and fall around the edge of the disk. This provides a lateral liquid distribution and results in a good mass transfer between the vapor and the liquid.

BRIEF DESCRIPTION OF THE DRAWINGS

The present invention will now be explained with reference to the accompanying drawings, in which.

DETAILED DESCRIPTION OF THE INVENTION

Figure 1:
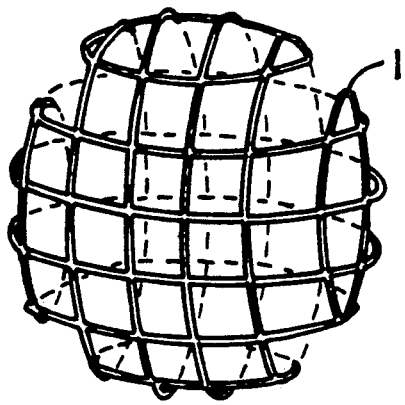
FIG. 1 is a perspective view of the contactor.

Referring to FIG. 1, the contactor includes a spherical cage 1. The cage 1 has a large open area for a vapor and a liquid to flow through. The cage 1 also has mechanical strength to maintain its structural integrity when stacked up inside a tower. The spherical shape will minimize interlocking among the contactors.

Figure 2:
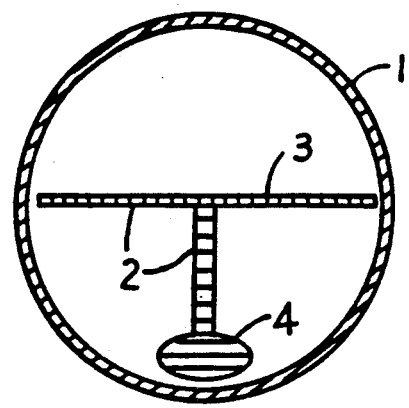
FIG. 2 is a sectional elevation view of the vapor-liquid contactor with the disk in the horizontal position.

Referring to FIG. 2, there is shown an embodiment of this invention. For clarity reasons, only the outline of the cage 1 is shown. Inside the cage 1 there is a movable packing assembly 2. The packing assembly 2 includes a disk 3, and a weight piece 4 attached to the disk 3. The surface of the disk 3 may be flat, concave upward, concave downward, or other suitable configurations. The diameter of the disk 3 is slightly smaller than the inside diameter of the cage 1. The weight piece 4 is attached to the underside of the disk 3 with its center of gravity located on the axis of the disk 3. Therefore when the disk 3 is in the horizontal position, the center of gravity of the weight piece 4 will be at the lowest position inside the cage 1. Thus according to a physical law the packing assembly 2 is at the most stable position inside the cage 1. The surfaces around the packing assembly 2 that may be in contact with the inside surface of the cage 1 are smooth, so that the packing assembly 2 can slide inside the cage 1. During the operation of a packed tower, the upward force of the vapor flow would cause the packing assembly 2 to seek the most stable position and thus the disk 3 would be in the horizontal position. This is an important feature of this invention. As the liquid falls on the top of the disk 3, it would be spread laterally across the disk 3 and fall around the edge of the disk 3 to form a liquid curtain. As the liquid cascades down through the tower, the liquid is spread laterally through the tower. This action results in a good liquid redistribution and a good vapor-liquid contact. The disk 3 and the weight piece 4 can be integrated and formed in one piece. The contactor may be made of plastic, ceramic, metal, or other suitable compositions.

Figure 3:
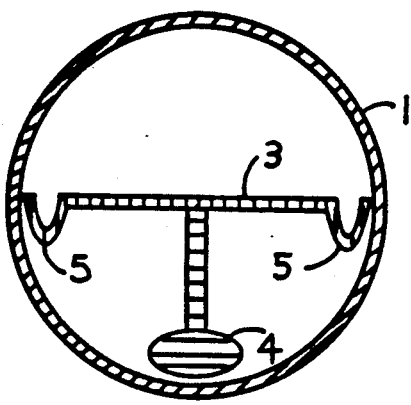
FIGS. 3 and 4 are sectional elevation views of modification of the disk.

FIG. 3 shows another embodiment of the present invention. There is a gutter 5 formed around the edge of the disk 3. The water that falls on the top of the disk 3 is evenly distributed through the gutter 5 and overflows to the contactor below. The outer edge of the gutter 5 can be flat or serrated.

Figure 4:
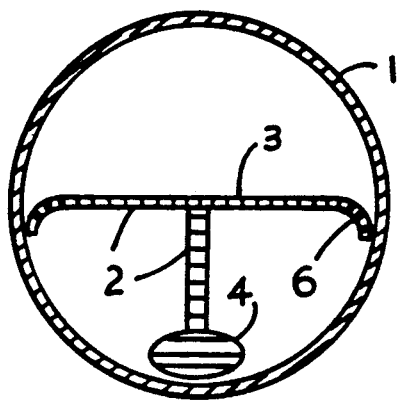

Referring to FIG. 4, there is shown a modified embodiment of my invention. The disk 3 includes seeping holes 6, and the outer edge of the disk 3 is bent downward. The seeping holes 6 provide more vapor-liquid contact as the liquid drips through the outer edge and the vapor penetrates through the holes 6.

Figure 5:
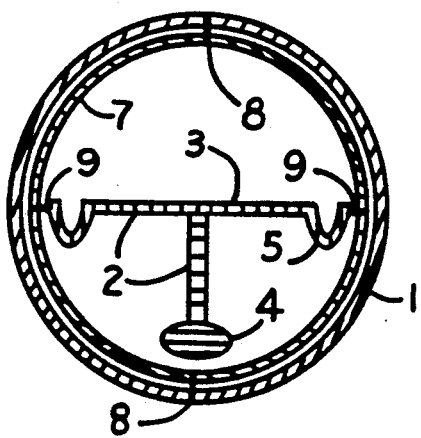
FIG. 5 is a sectional elevation view of another modification of the invention, showing the packing is pivoted to an inner ring, and the inner ring is pivoted to the cage.
Figure 6:
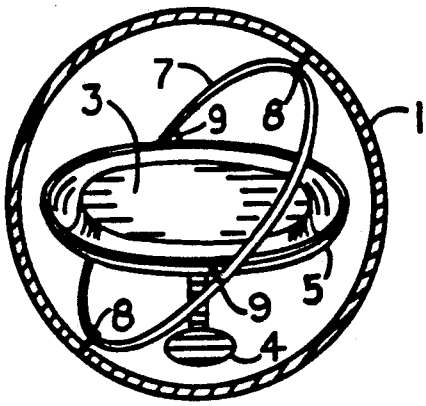
FIG. 6 is an interior view of FIG. 5 where the inner ring is in a different cage orientation.

Another embodiment of my invention is shown in FIG. 5. An inner ring 7 is pivoted with pivots 8 around its diameter to the cage 1 along an imaginary polar axis of the cage 1. The inner ring 7 can rotate freely inside the cage 1 along the imaginary polar axis. Inside the inner ring 7, and perpendicular to the imaginary polar axis, the disk 3 is pivoted with pivots 9 around its diameter to the ring 7, so that the disk 3 and the weight piece 4 can rotate freely inside the ring 7. FIG. 6 shows that at any orientation of the cage 1, the disk 3 will be in the horizontal position due to the effect of pivoting action and gravitational force of the weight piece 4. It is to be understood that the shapes of the cage 1, the inner ring 7, and the disk 3 can be varied, as long as the inner ring 7 and the disk 3 can rotate freely inside the cage 1. For example, the shape of cage 1 can be cubical, the inner ring 7 and the disk 3 can be square.

CONCLUSION, RAMIFICATION AND SCOPE OF INVENTION

While the above description contains many specificities, these should not be construed as limitations on the scope of my invention, rather as exemplifications of preferred embodiments thereof. Many other variations are possible. Accordingly, the scope of the invention should be determined not by the embodiments illustrated, but by the appended claims and their legal equivalents:

What I claim is:

1. A vapor-liquid contactor for promoting mass transfer between a vapor and a liquid, comprising:
   a spherical cage for providing mechanical and structural strength of the contactor, and openings for the vapor and liquid flow passage,
   a packing assembly positioned inside said cage, said packing assembly being movable relative to said cage comprising:
   (1) a disk means having a diameter smaller than the inside diameter of said cage,
   (2) means defining a weight attached to the underside of said disk and formed an outward protrusion from the underside of said disk; the center of gravity of said weight being located approximately on the axis of said disk; in response to an upward force exerted by the vapor flow, said weight co-acting with said disk to move the center of gravity of said weight to the lowest position inside said cage and resulted in said disk being in the horizontal position, whereby the liquid falling on the top of said disk can be spread laterally across said disk and achieving a better liquid distribution and a good vapor-liquid contact.

2. The invention of claim 1 wherein said contactor is made of a material characterized by plastic, ceramic, metal, and a combination of these.

3. The invention of claim 1 wherein said disk and said weight are formed as an integral piece.

4. The invention of claim 1 wherein said disk having a shape characterized by upward concavity, downward concavity, and flat plate.

5. The invention of claim 1 wherein said disk including a plurality of vapor seeping holes.

6. The invention of claim 1 wherein said disk having a gutter around the edge of said disk, whereby the liquid falling on said disk can be evenly distributed and overflow around the outer edge of said gutter.

7. The invention of claim 6 wherein said gutter having a serrated outer edge.

8. A vapor-liquid contactor for promoting mass transfer between a vapor and a liquid, comprising:
   a cage for providing mechanical and structural strength of the contactor, and openings for the vapor and liquid flow passage,
   a ring means located inside said cage, said ring being pivoted around a pivot-line to said cage, said ring can rotate freely inside said cage, the pivot-line passes approximately through the center of said ring,
   a packing assembly positioned inside said ring, said packing assembly comprising:
   (1) a disk means pivoted around its centerline to said ring; the centerline of said disk being substantially perpendicular to the pivot-line of said ring,
   (2) means defining a weight attached to the underside of said disk and formed an outward protrusion from the underside of said disk; the center of gravity of said weight being located approximately on the axis of said disk; in response to the gravitational force, said weight co-acting with said disk to move the center of gravity of said weight to the lowest position inside said cage and resulted in said disk being in the horizontal position, whereby the liquid falling on the top of said disk can be spread laterally across said disk and achieving a better liquid distribution and a good vapor-liquid contact.

9. The invention of claim 8 wherein the shape of said cage being spherical, said ring and said disk being circular.

* * * * *